(12) United States Patent
Mehta et al.

(10) Patent No.: US 10,892,892 B1
(45) Date of Patent: Jan. 12, 2021

(54) METHOD AND APPARATUS FOR END-TO-END SECURE SHARING OF INFORMATION WITH MULTIPLE RECIPIENTS WITHOUT MAINTAINING A KEY DIRECTORY

(71) Applicant: Volterra, Inc., Santa Clara, CA (US)

(72) Inventors: Manish Mehta, San Jose, CA (US); Mark Weiner, Los Gatos, CA (US)

(73) Assignee: Volterra, Inc., Santa Clara, CA (US)

( * ) Notice: Subject to any disclaimer, the term of this patent is extended or adjusted under 35 U.S.C. 154(b) by 0 days.

(21) Appl. No.: 16/864,732

(22) Filed: May 1, 2020

(51) Int. Cl.
*H04L 9/32* (2006.01)
*H04L 9/08* (2006.01)
*H04L 29/06* (2006.01)

(52) U.S. Cl.
CPC .......... *H04L 9/0825* (2013.01); *H04L 9/0869* (2013.01); *H04L 9/3249* (2013.01); *H04L 9/3257* (2013.01); *H04L 63/20* (2013.01)

(58) Field of Classification Search
CPC ............... H04L 9/3257; H04L 9/90825; H04L 9/93249; H04L 9/0869; H04L 63/20
See application file for complete search history.

(56) References Cited

U.S. PATENT DOCUMENTS

| | | | | |
|---|---|---|---|---|
| 2004/0083382 | A1* | 4/2004 | Markham | H04L 63/102 726/1 |
| 2010/0138899 | A1* | 6/2010 | Yamamoto | H04L 63/0815 726/3 |
| 2011/0072082 | A1* | 3/2011 | Fujiwaka | G06F 9/5044 709/203 |
| 2011/0164752 | A1* | 7/2011 | Wainner | H04L 12/1818 380/277 |
| 2016/0364577 | A1* | 12/2016 | Williams | H04L 63/083 |
| 2018/0115535 | A1* | 4/2018 | Mehta | H04L 9/3249 |

* cited by examiner

*Primary Examiner* — Ali S Abyaneh
(74) *Attorney, Agent, or Firm* — Rimon PC; Marc Kaufman

(57) ABSTRACT

A method and computer architecture for securely sharing information with an arbitrary set of users in end-to-end fashion. A secure data sharing system includes clients and servers. Client programs running on specific client computers encrypt plaintext data and cryptographically bind the decryption of the encryption key to policy information that contains rules about a permitted decryption operation access. Other clients decrypt the encrypted data shared by the original client by proving to the server their identity and in return receiving cryptographic material.

26 Claims, 7 Drawing Sheets

METHOD AND APPARATUS FOR END-TO-END SECURE SHARING OF INFORMATION WITH MULTIPLE RECIPIENTS WITHOUT MAINTAINING A KEY DIRECTORY

TECHNICAL FIELD

This disclosure pertains to cryptography in general, and more specifically to a method and apparatus of end-to-end secure sharing of Information without maintaining a key directory.

BACKGROUND

With more and more Enterprises and individuals performing business and personal activities using electronic mediums over untrusted communication channels, concerns about confidentiality and integrity of the information sent over these channels have been increasing. Cryptographic algorithms and protocols have been used to provide these properties to the information while it is in transit (e.g. in the communication channel or in storage).

The cryptographic algorithms and protocols provide desired properties of confidentiality and integrity under certain assumptions about the setup that can be considered as a prerequisite. One of the fundamental parts of this setup is what is known as cryptographic key management or key distribution.

Sharing information securely end-to-end pertains to the property of a system that, under the underlying assumptions of used cryptographic algorithms and protocols, assures the communicating parties that no other party (including any untrusted party operating the underlying communication channels) is able to read the original information or modify the original information without detection.

Known techniques for secure end-to-end sharing either require complex key management systems or rely on a third party to manage keys. For users, complex key management requires special technical training. It often also results in difficulties switching devices and ultimately increases user errors. For administrators, especially in cases of enterprises, complex key management requires custom integrations, training, and timely revocation to achieve the security goals. Relying on a third party increases the risk for users—especially if the third party also stores the encrypted information while performing the key management functions.

SUMMARY

A user who wants to securely share information with other arbitrary set of users in end-to-end fashion has to either encrypt the information separately for the individual user in situation where each of them has a unique cryptographic key, or has to encrypt the information with a single key and then find a way to distribute the decryption key to the desired set of users—which essentially simply shifts the problem of secure sharing from the original information to the decryption key.

When the recipient list is small and not changing, it may be manageable to maintain every recipient's key and encrypt the same information once per recipient. Once the list of recipients has grown even in 10s—especially in an environment where the list is changing often—management of a key list or a key directory becomes difficult and resource intensive. Such management is even more difficult when the user has multiple devices that may be the source of the information to be sent.

It is further desirable that if a third party is used to maintain a key directory for the users, the third party does not have to be trusted as part of encryption and decryption of the information. In other words, if the third party managing the key directory, in a compromised or uncompromised state, can access the information the user is encrypting or decrypting, the property of end-to-end encryption is compromised. Applicant has developed a secure data sharing system involving clients and servers, wherein client programs running on specific client computers encrypt plaintext data and cryptographically bind the decryption of the encryption key to policy information that contains rules about a permitted decryption operation access, and other clients decrypt the encrypted data shared by the original client by proving to the server their identity and in return receiving cryptographic material to recover the plaintext data.

The disclosed implementations achieve end-to-end encryption property without the need for users or any third party to maintain a key directory tied to individual users. The design also allows the user to achieve end-to-end encryption for multiple recipients without performing encryption multiple times, for example—once per recipient.

The disclosed implementations also protect the users' information during interactions with the third party, even when the third party systems are not secure. The policies can include parsable data structures that include identifiers of multiple recipients, wherein the recipient identifiers are used for messaging or authentication of an individual or another computer. The policy can be generated at the time of encryption or stored for later use. The clients do not need to maintain a key directory of other clients mapped to one or more cryptographic keys. Each client can act as sender or recipient of the data. The clients can perform operations against the server on an authenticated channel, without sending the plaintext or encrypted plaintext to the server. The server can allow or disallow contents of the policy before the policy information is used to protect the plaintext. The server can store one key set per client and/or use the same key set for a group of clients. The plaintext encryption key can be cryptographically tied to the policy information using modular arithmetic. The binding of the policy information with the plaintext encryption key can follow modular exponentiation without any standard padding techniques. The client intending to decrypt the encrypted data performs cryptographic blinding operation on the encrypted plaintext encryption key by choosing a random value between 1 and public key modulus selected by the server. The server can enforce the policy during encrypt and decrypt operation requests based on the identity of the client and override policies of administrators.

The features and advantages described in this summary and in the following description are not all-inclusive, and particularly, many additional features and advantages will be apparent to one of ordinary skill in the relevant art in view of the drawings, specifications, and claims hereof. Moreover, it should be noted that the language used in the specification has been principally selected for readability and instructional purposes, and may not have been selected to delineate or circumscribe the inventive subject matter defined by the attached claims.

BRIEF DESCRIPTION OF THE DRAWINGS

The present invention may be better understood, and its numerous features and advantages made apparent to those skilled in the art by referencing the accompanying drawings. For ease of understanding and simplicity, common numbering of elements within the illustrations is employed where an element is the same in different drawings.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
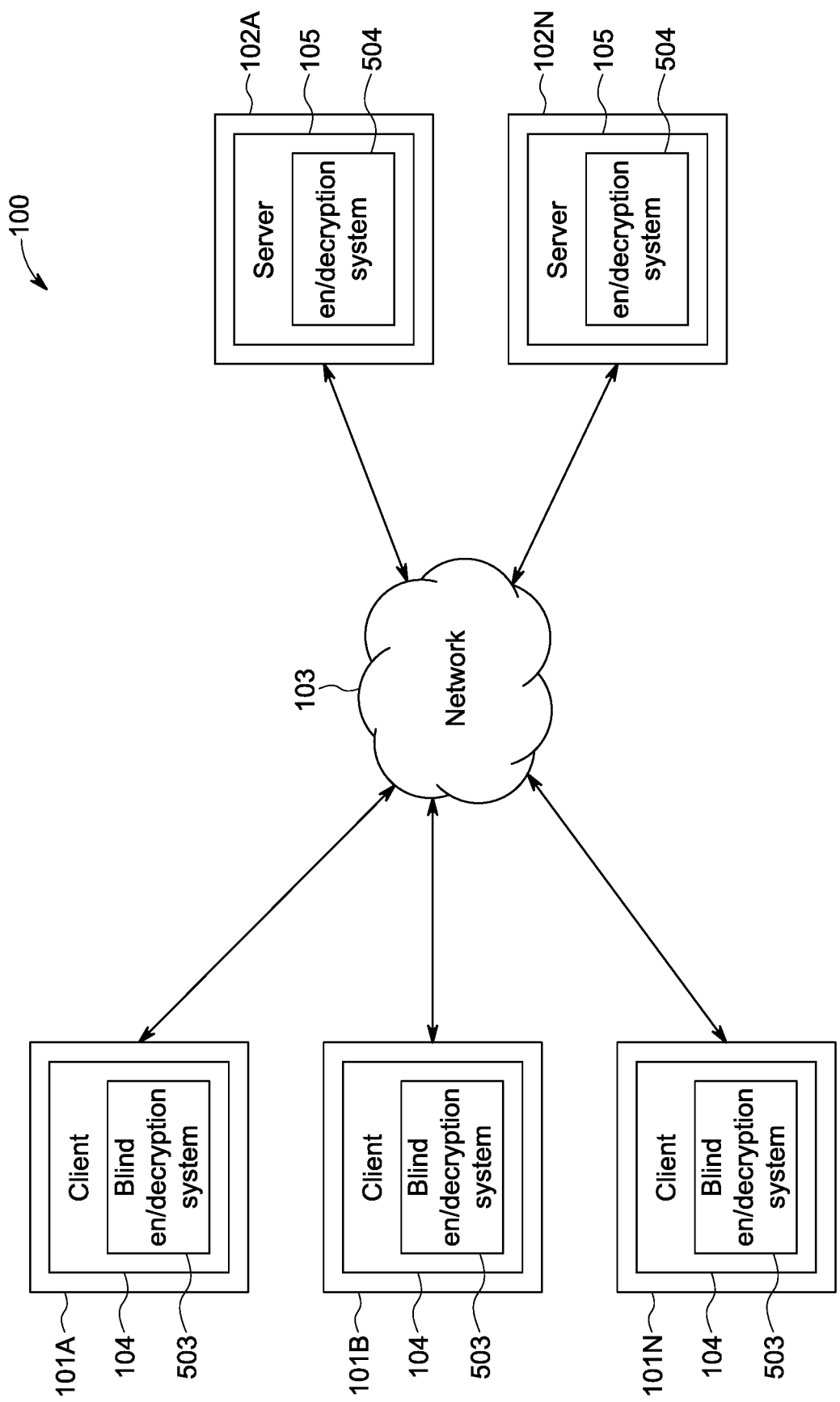
FIG. 1 is a block diagram of an exemplary network architecture in which a secure sharing system can be implemented, according to some embodiments.

FIG. 1 is a block diagram illustrating an exemplary computer network architecture 100 in which a secure sharing can be implemented. The illustrated network architecture 100 comprises multiple clients 101A, 101B and 101N, as well as multiple servers 102A and 102N.

In FIG. 1, component 105 of the secure sharing system which includes encryption/decryption system 504 is illustrated as residing on server 102A, and a separate client component 104 of the secure sharing system which includes encryption/decryption system 503 is illustrated as residing on each client 101A-N. It is to be understood that this is an example only, and in various embodiments various functionalities of this system can be instantiated on a client 101, a server 102, or can be distributed between multiple clients 101 and/or servers 102.

Although FIG. 1 illustrates three clients 101 and two servers 102 as an example, in practice many more (or fewer) clients 101 and/or servers 102 can be deployed. In one embodiment, network 103 is in the form of public Internet, although other networks (e.g. a private enterprise level wide area network) can be used in other embodiments.

Clients 101 and servers 102 can be implemented using computer systems 210 such as the one illustrated in FIG. 7 and described below. The clients 101 and servers 102 are communicatively coupled to the network 103, for example via a network interface 248 or modem 247 as described below in conjunction with FIG. 7. Clients 101 are able to access applications and/or data on servers 102 using, for example, a web browser or other client software (not shown). Clients 101 can be in the form of desktop computers, laptop computers, or mobile computing devices, comprising portable computer systems capable of connecting to a network 103 and running applications. Such mobile computing devices are sometimes referred to as smartphones, although some mobile phones not so designated also have these capabilities. Tablets and wearable computing devices (e.g., smart watches, bracelets, glasses, etc.) are other examples of mobile computing devices.

Figure 2:
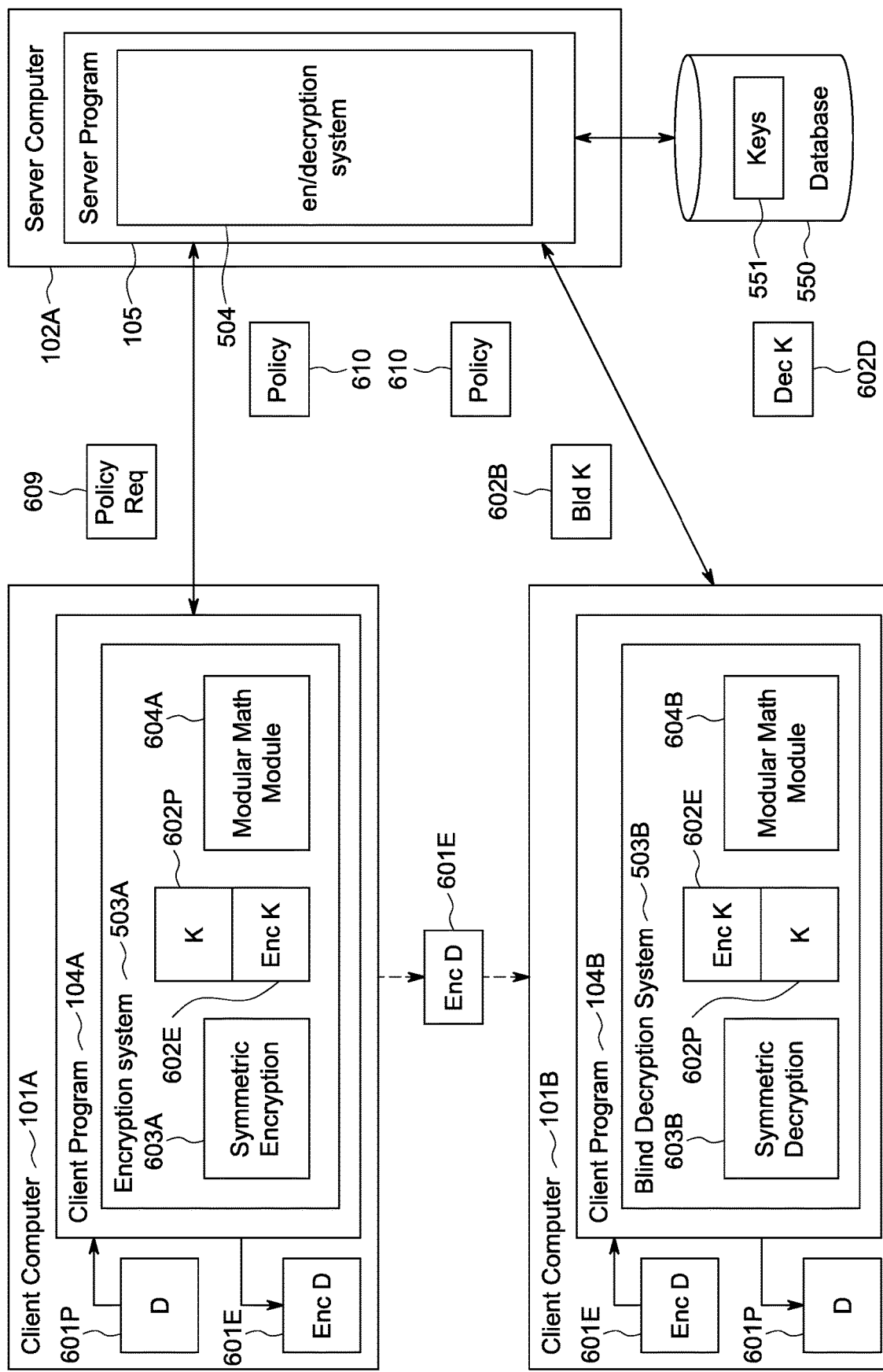
FIG. 2 is a block diagram of the operation of a secure sharing of information, according to some embodiments.

FIG. 2 illustrates the operation of a secure sharing system components 104 and 105, according to some embodiments. In FIG. 2, the secure sharing system components 104 and 105 are illustrated as comprising a server component 105 residing on a server 102 and separate client components 104 residing on a first client 101A and on a second client 101B. As described above, the functionalities of the components 104 and 105 can reside on a client 101, a server 102, or be distributed between multiple computer systems 210. It is to be understood that although the server component 105 and client components 104 of the secure share system are both illustrated in FIG. 2 as single entities, the secure sharing system represents a collection of functionalities, which can be instantiated as a single or multiple modules as desired. In some embodiments, the different modules of the secure components 104 and 105 can reside on different computing devices 210 as desired. It is to be understood that the modules of the components 104 and 105 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the components 104 and 105 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 2, a server component 105 of the secure sharing system runs on a server 102, a client component 104A of the secure sharing system runs on the first client 101A, and a separate client component 104B runs on the second client 101B. Although only two clients 101 are illustrated and described in conjunction with FIG. 2, it is to be understood that a single server component 105 of the secure sharing system can interact with orders of magnitude more separate client components 104 residing on a large number of clients 101.

Suppose the first client 101A maintains sensitive data 601P (e.g., private data), which it would like to securely provide to the second client 101B. The first client 101A lacks a secure channel to the second client other than the use of the server's supported cryptographic services. More specifically, the server 102 supports secure asymmetric cryptography using RSA, and makes its public key 551 available to the clients 101 based on the client's identity. Hence, the client component 104A on the first client 101A could encrypt the data 601P using the server's public key 551 and transmit the encrypted data 601E to the second client 101B.

To carry out these steps, the client component 104A on the first client 101A could first create a policy request 609 which includes the intended recipient's identifier (client 104B).

After server 105 responds with policy 610, the client component 104A on client 101A first encrypts the plaintext data 601P with a random symmetric key 602P and then encrypts it using the server's public key 551 and policy metadata from policy document 610 by following the steps described below:

$$M = (K)^{e \cdot p} \bmod N.$$

where:

K is the symmetric encryption key used to encrypt the original sensitive information 601P.

M is encrypted symmetric key 602E p is the Policy information e is the RSA public value

N is the RSA modulus

Using standard binary packing mechanism, client component 104A on client 101A puts encrypted 601P, M, policy metadata 610, and server's key 551 together to construct encrypted package 601E.

Figure 3:
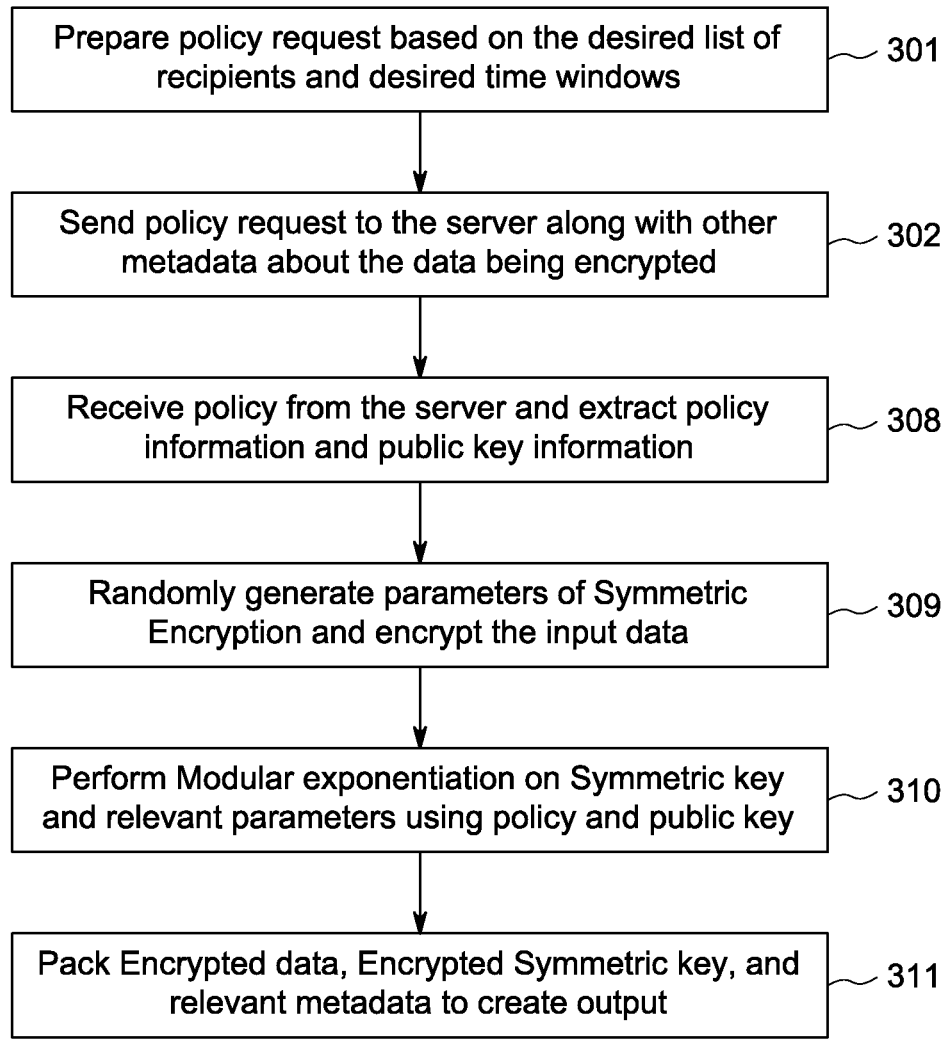
FIG. 3 is a flowchart illustrating sender (client) side steps for the encryption operation for secure sharing of information, according to some embodiments.

This process is described in FIG. 3.

Encrypted package 601E can now be provided to the second client component 104B on client 101B by the first client component 104A on client 101A over any communication channel regardless of its trustworthiness with regards to confidentiality and integrity of the carried data.

Once client component 104B on client 101B receives the encrypted data 601E, the client would have to communicate with server component 105 on server 102 in order to decrypt the data. However, if the client components 104B sends the encrypted package 601E as-is to the server component 105 for decryption, then the server component 105 would learn the unencrypted version of 601E, which is 601P. This is not desirable if the server is a third party which cannot be trusted. Even if the client sent M 602E part out instead of the entire encrypted package 601E, the server would learn an unencrypted version of 602E, which is 602P.

It is desirable that the server component is able to perform the necessary decryption operation without being able to access the unencrypted symmetric key.

It is to be understood that secure transmission of a encrypted symmetric key 601E from the first to the second client 101 is only one example of a scenario in which it is desirable for clients to avail themselves of the server's support of RSA and the corresponding server side decryption, without the server 102 learning the secret(s) 601E or 602E at issue. For example, as noted above, a client 101 may wish to securely store encrypted data 601E locally or remotely, such that it can be accessed by one or more given target parties under specific circumstances. In another example scenario, a client 101 could encrypt and store encrypted data 601E, and later the same client 101 could wish to have the server 102 decrypt the encrypted data 601E without being able to learn its content.

Recall that in this example embodiment the second client 101B received the encrypted data 601E from the first client 101A. The second client 101B could then transmit the encrypted data 601E to the server 102 to decrypt using the private key, but as noted above if that were done then the server 102 would have the original data 601P in the clear. In order to avail itself of the server's decryption services without the server 102 learning the original data 601P, the client components 104 and server component 105 of the secure sharing system can utilize a technique called blinding, as described in detail below.

In cryptography, blinding is a technique by which one party (in this case the server 102) can compute a function (in this case decryption) for another party (in this case the client 101) in an encoded form without knowing either the actual input or output. Here, the client 101 has an input 602E which it would like the server 102 to decrypt on its behalf, because the client 101 does not have the server's key 551 which is required to decrypt 602E. However, as discussed above, the client 101 does not wish for the server to learn 602P, and hence the server 102 cannot know 602E either. To achieve this, the client 101 blinds the input by encoding it according to a function that is mathematically compatible with the cryptographic functions, such that a message can be encrypted, blinded, decrypted, and unblinded without losing integrity. In other words, when the encrypted, blinded text is decrypted, the result is a decrypted message that is still blinded, cannot be discerned without being unblinded, but after being unblinded is the original message in the clear.

For example, if Alice has a secret message S she wishes to securely share with Bob, but needs Pete to decrypt the message without reading it, she could blind the encrypted secret M as B(M)=Z, where B( ) is the blinding function.

Alice then sends Z to Pete, who does not learn M since it is encoded by the blinding function. Pete decrypts the blinded encrypted message Z as D(Z)=φ, where φ is the decrypted but still blinded message. Pete thus does not learn S, because Pete is only exposed to the decrypted message in blinded form. Pete provides φ to Bob, who shares Alice's unblinding function U( ). Consequently, Bob is able to unblind φ resulting in the original S.

The blinding function utilizes a blinding factor R. In order for the blinding and unblinding to work in conjunction with the encryption and decryption, where f(x) is the cryptographic function performed by Pete, the blinding (encoding) factor R must be a bijection on the input space of f. The security is most robust where R is further a random permutation. Pete returns f(B(x)), to which Bob applies the unblinding function U( ) to obtain U(f(B(x)))=S. Not all functions allow for blind computation, but RSA cryptography does.

More specifically, in RSA blinding involves computing the blinding operation $B(x)=(xR)^e \bmod N=Z$, where R (the blinding factor) is a random integer between 1 and N and relatively prime to N (i.e., gcd(r, N)=1) where gcd is the greatest common denominator, x is the plaintext, e is the public RSA exponent, N is the RSA modulus and Z is the encrypted, blinded text. To decrypt Z, the RSA decryption function $D(Z)=Z^d \bmod N$ is applied, giving $D(B(x))=(xR)^{ed} \bmod N=xR \bmod N=\Phi$, where d is the private RSA exponent and φ is the decrypted, blinded text. φ can be unblinded using the unblinding function $U(\Phi)=\Phi R^{-1} \bmod N$. Multiplying xR mod N by $R^{-1}$ mod N yields x (the plaintext), as desired.

Thus, in the example embodiment currently being described, the second client 101B receives the encrypted data 601E from the first client 101A. The second client component 104B then blinds the encrypted data 602E before providing it to the server 102 for decryption. Because the symmetric key 602B is blinded, the server 102 is not able to learn the symmetric key 602P, even after decrypting it. Note that the specific blinding factor used by the client component 104 is calculated on the fly at run time and only used once. More specifically, when blinding the encrypted symmetric key 602E, a client component 104 uses a suitable random permutation as the blinding factor R. Since the client component 104 creates a one-time use blinding factor R on the fly during each blinding operation, each specific value used for R is ephemeral. This provides a high level of security. In effect, the blinding operation places the encrypted symmetric key 602E into a secure box.

However, blinded encrypted client symmetric key 602B is still not enough for the server 102 to distinguish between clients 101 securely. Recall that the server 102 is communicating with a large number of separate clients 101 within and across organizations. Each client 101 under the server's jurisdiction (e.g., each client 101 within the given tenancy) is governed by the server 102 according to given policy 610. Policy 610 specifies the sender client 101A's list of allowed parties that should be able to decrypt the symmetric key. Since every policy is unique and mathematically tied to the encrypted data, requesting clients cannot present a forged policy.

In order to provide a blinded version of encrypted symmetric key 602E bound to policy 610 to the server 102, the second client component 104B can generate $Z_p$ (the blinded encrypted message Z 602B bound to policy p 610) as follows:

$$Z_p = MR^{ep} \bmod N$$

Where:
M is the encrypted symmetric key 602E to be decrypted
R is the blinding factor
e is the RSA public value
p is the policy 610 to bind
N is the RSA modulus The second client component 104B transmits $Z_p$ 602B, the blinded encrypted symmetric key bound to the policy 610, to the server component 105.

Figure 5:
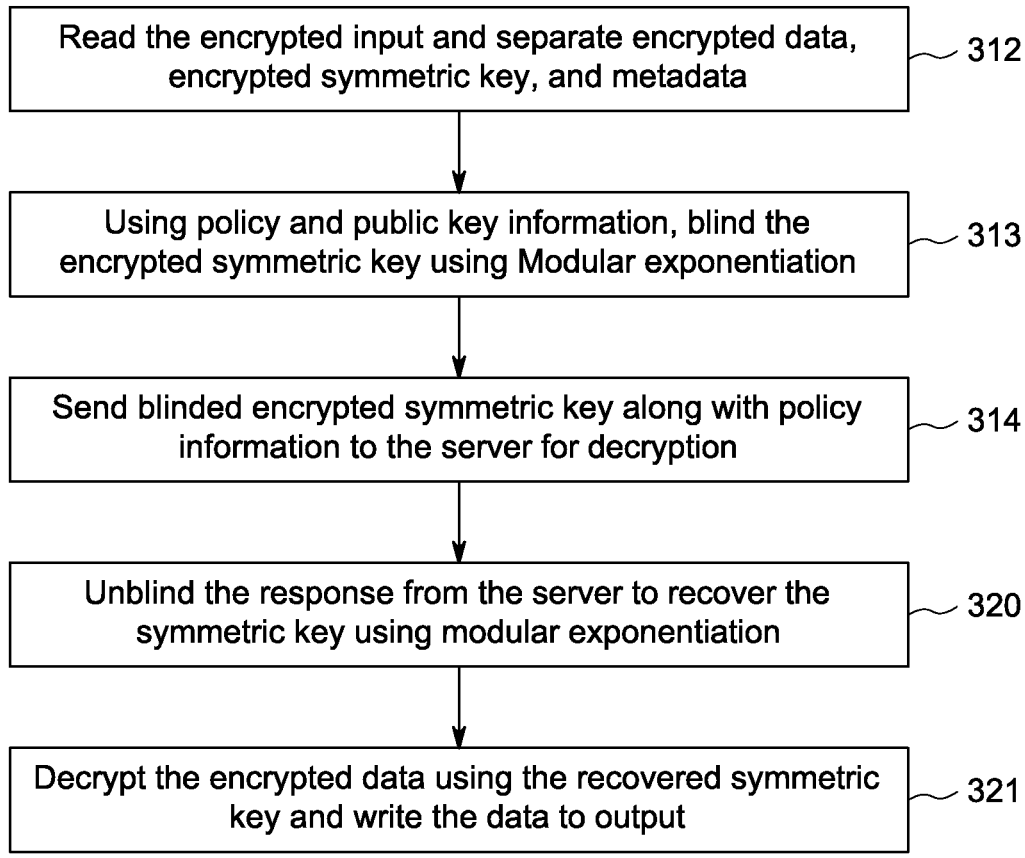
FIG. 5 is a flowchart illustrating receiver (client) side steps for the decryption operation for secure sharing of information, according to some embodiments.

This process is described in FIG. 5.

The server component 105 can now decrypt and further process $Z_p$ 602B according to the terms of the specific policy 610. In order to decrypt $Z_p$, the server component utilizes its key 551 as well as the policy information 610, resulting in the unencrypted but still blinded symmetric key 602D. Thus, the server 102 does not access the symmetric key 602P in the clear, nor does the plaintext exist in code or memory on the server side at any point. What this means is that even if the server was compromised, and a malicious entity had complete control over the server 102, the malicious entity cannot learn the unencrypted symmetric key 602P.

To decrypt the blinded encrypted symmetric key 602B, also denoted by $Z_p$, the server program 105 computes the following:

$$d = (ep)^{-1} \bmod \lambda$$

$$\Phi =_p)^d \bmod N$$

Where:
φ is the blinded, decrypted data 602D
λ is the RSA prime function
p is the policy information
N is the RSA modulus This produces φ which is the decrypted, yet blinded value of the original symmetric key 602P. φ is denoted by 602D in FIG. 2.

The server component 105 returns this blinded decrypted data 602D to the client upon successful policy evaluation.

Figure 6:
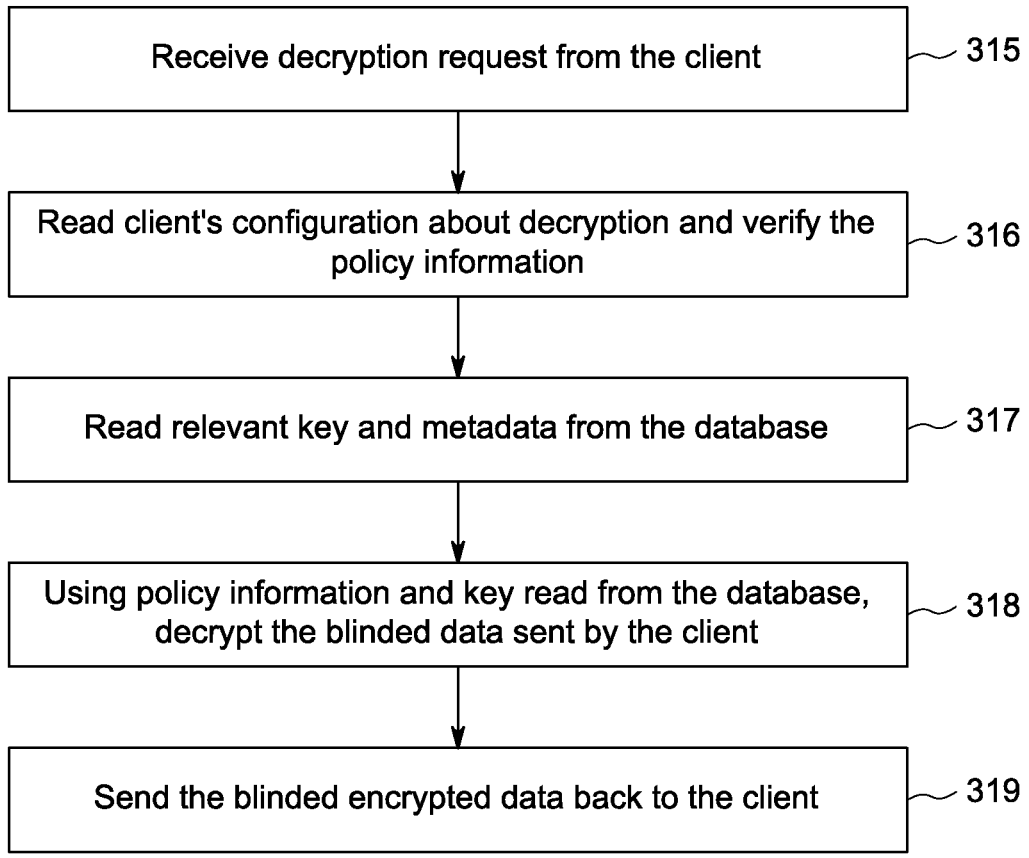
FIG. 6 is a flowchart illustrating server side steps for the decryption operation for secure sharing of information, according to some embodiments.

This process is described in FIG. 6.

With the decrypted, but still blinded, data back to the client component 104б, it needs to perform the last operation of removing the blinding value from the received data φ depicted as 602B in FIG. 2. In order to perform this operation, the client component 104B recalls the blinding factor R that was randomly generated in the blinding process before sending the encrypted data 602E to the server. The client component 104B removes the blinding by performing the following operation:

$$K = \Phi R^{-1} \bmod N$$

where:
K is the recovered plain symmetric key 602P
φ is the blinded, decrypted data 602D
R is the blinding factor
N is the RSA modulus Once the plain symmetric key 602P is recovered, client component 104B can decrypt the actual data in 601E and recover plain 601P.

This process is also described in FIG. 5.

It is to be understood that the secure transmission of a symmetric key 601P between clients 101 using the server's decryption function is only one example of an instance in which client(s) 101 can beneficially utilize the server's decryption function without the server 102 learning the secret(s) 601P or 602P. Many other examples will be apparent to those of ordinary skill in the relevant art in light of this specification, such as sharing specific data with a group, storing data in a given folder accessible to specific parties, etc.

FIG. 3 shows sender client side steps performed during the course of the encryption operation of the client component 104 according to the above-described example. First, client component 104A prepares, at 301, a policy request 609 (see FIG. 2). It then sends, at 302, the policy request 609 along with other metadata about the data being encrypted. Once the policy request receives a response (610 in FIG. 2), at 308, from server component 105, the client component 104A extracts the policy information from the response 610. The client now randomly generates, at 309, a symmetric key and relevant parameters to encrypt the input data 601P (FIG. 2). Once the data is encrypted using the symmetric key, the client performs Modular Exponentiation 310 on the key generated, at 309, on the policy information and other metadata using the public key from the server. Finally, the client component 104A puts all encrypted data produced in steps 309 and 310 together and produces output 601E (FIG. 2) that can be shared with the recipients using any mechanism, at 311.

Figure 4:
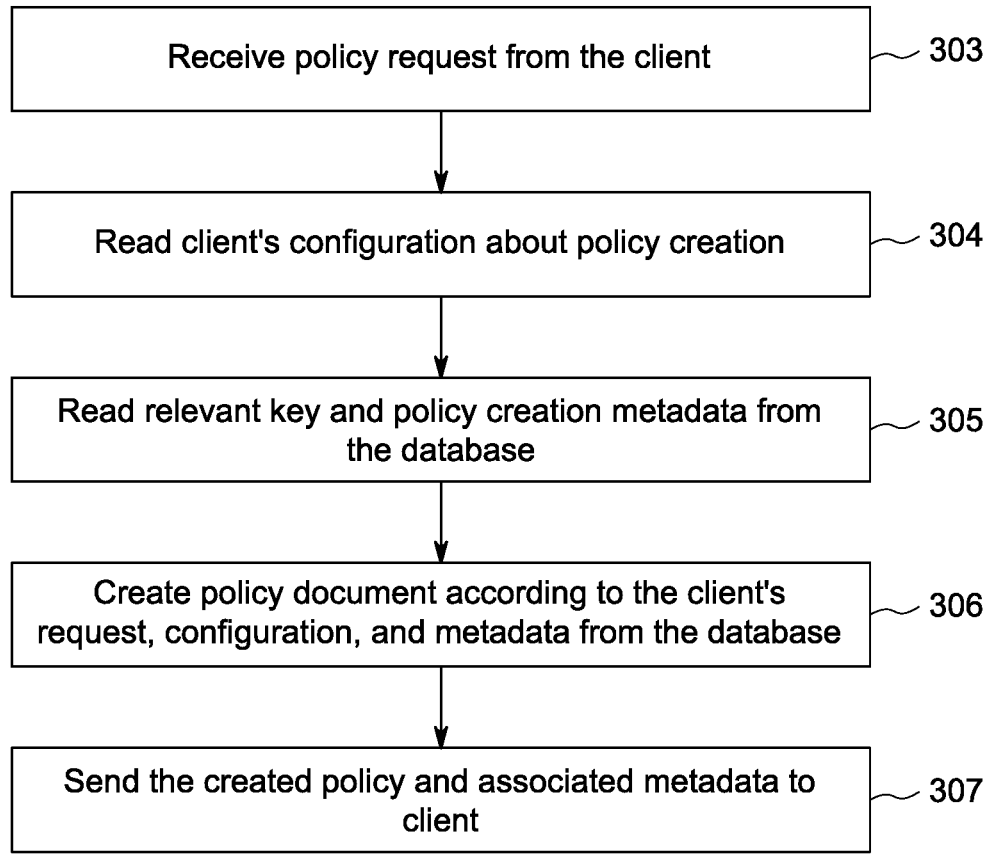
FIG. 4 is a flowchart illustrating server side steps for the policy generation operation for secure sharing of information, according to some embodiments.

FIG. 4 shows server side steps performed during the course of the policy creation operation of the server component system 105 according to the above-described example. Server component 105 first receives, at 303, policy request 609 (FIG. 2) from client component 104A. Server component 105 then reads client's configuration, at 304, about policy creation from the database 550 (FIG. 2) and validates the request 609 against the configuration. Server component 105 then reads relevant key and policy creation related metadata, at 305, from the database 550. Putting data together from the policy request 609 (FIG. 2), the configuration data, and key data, the server prepares, at 306, policy information. Finally, the server returns, at 307, the policy information as response 610 (FIG. 2) to the client component 104A.

FIG. 5 shows receiver client side steps performed during the course of the decryption operation of the client component 104 according to the above-described example. The client component 104B first reads encrypted data 601E (FIG. 2) sent by client 104A and separates, at 312, the encrypted data, encrypted symmetric key 602E (FIG. 2), and metadata. Using the policy information 610 (FIG. 2) and public key information, client component 104B performs a blinding operation, at 313, on 602E (FIG. 2) to produce a blinded version 602B (FIG. 2). The client component 104B then sends 314 this blinded version 602B (FIG. 2) along with the policy information 610 (FIG. 2) as a part of the decryption request to the server 105 (FIG. 2). Once the client component 104B receives the response with blinded encrypted version 602D (FIG. 2), it performs and unblinding operation, at 320, to recover 602P (FIG. 2) using Modular Exponentiation. With the recovered 602P (FIG. 2), the client component 104B then decrypts the remaining part of 601E (FIG. 2) to recover original data 601P (FIG. 2).

FIG. 6 shows server side steps performed during the course of the decryption operation of the server component 105 according to the above-described example. Server component 105 first receives decryption request, at 315, with policy information and blinded encrypted data 602B (FIG. 2) from client component 104B. Server component 105 then reads client's configuration, at 316, about decryption from the database 550 (FIG. 2) and validates the request against the configuration. Server component 105 then reads relevant key and policy creation related metadata, at 317, from the database 550 (FIG. 2). Putting data together from the policy information 610 (FIG. 2), the configuration data, and key data, the server component 105 performs a decryption operation, at 318, on blinded encrypted data 602B (FIG. 2) to produce blinded decrypted data 602D (FIG. 2). Finally, the server component 105 returns 319 the blinded decrypted data 602D (FIG. 2) to the client component 104B.

Figure 7:
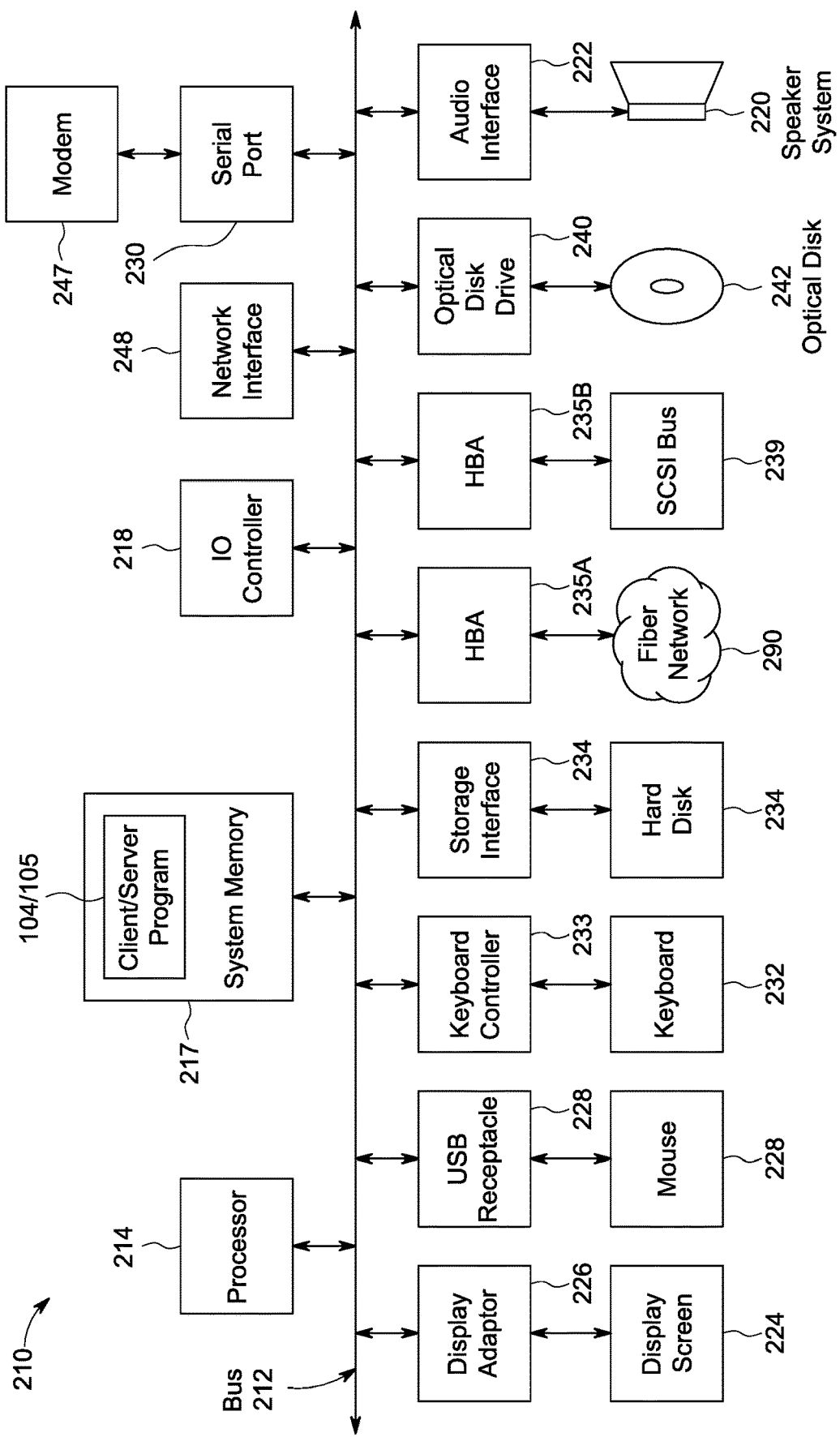
FIG. 7 is a block diagram of a computer system suitable for implementing client and server components of a secure sharing system, according to some embodiments.

FIG. 7 is a block diagram of a computer system 210 suitable for implementing secure sharing system including client components 104A and 104B and server component 105. Both clients 101A and 101B and server(s) 102 can be implemented in the form of computer systems 210 or similar systems. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 7 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 7.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 7, the secure sharing system 104 and 105 is illustrated as residing in system memory 217.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed:

1. A computer implemented method for managing encrypted data comprising:

computationally generating, by a specific client computer, a onetime use blinding factor, wherein the onetime use blinding factor is a randomly selected member of a set of blinding factors compatible for blinding values and is encrypted using a public key of an server computer;

blinding an encrypted symmetric key, by the specific client computer, using the onetime use blinding factor and policy information corresponding to a policy governing the client computer to create an encrypted, blinded symmetric key bound to the policy information, the policy being created by the server computer based on the policy information from the client computer by validating the policy information against a corresponding client policy creation configuration, whereby the private key of the server computer and the policy information can be used to decrypt the encrypted blinded symmetric key but cannot be used to unblind the encrypted blinded symmetric key; and transmitting the encrypted blinded symmetric key by the specific client computer to the server computer, wherein the blinding factor is not communicated to the server and whereby the server computer can process the encrypted blinded symmetric key according to the policy to which the encrypted blinded symmetric key is bound.

2. The method of claim 1 wherein the computationally generating a onetime use blinding factor comprises generating a value that is a bijection on the input space of a decryption function used by the server computer for decrypting values encrypted using the public key, the generated value further comprising a random permutation.

3. The method of claim 1 wherein encryption and decryption are performed by the server computer using RSA encryption algorithm, and wherein computationally generating a onetime use blinding factor comprises selecting a random integer between 1 and RSA modulus N and relatively prime to RSA modulus N.

4. The method of claim 1 further comprising encrypting the symmetric key, by the specific client computer, using a public key returned by the server computer in connection with the policy information, wherein the policy information specifies a policy for managing the encrypted data.

5. The method of claim 4 wherein encrypting the symmetric key using the public key comprises encrypting the symmetric key using an RSA encryption function, with an RSA public exponent, the policy information and an RSA modulus as parameters.

6. The method of claim 5 further comprising encrypting and blinding the symmetric key K by applying $(K)^{e \cdot p}(R)^{e \cdot p}$ mod N, where K is the symmetric key, e is the RSA public exponent, p is the policy information, R is the onetime use blinding factor and N is the RSA modulus, resulting in the encrypted blinded symmetric key bound to the policy information.

7. The method of claim 1 further comprising receiving the encrypted data, by the client computer, from a separate client computer, the separate client computer having encrypted the data using a public key associated with the policy information.

8. The method of claim 1 wherein the server computer processes the encrypted blinded symmetric key according to the policy information, wherein the policy information corresponds to a unique policy id to which the encrypted blinded symmetric key is bound, and the method further comprises:
   decrypting, by the server computer, the encrypted blinded symmetric key using a private key of the server computer and the unique policy id, resulting in a decrypted blinded symmetric key bound to the unique policy id, wherein the decrypted blinded symmetric key is not discernible to the server computer; and
   transmitting the decrypted blinded symmetric key bound to the policy information by the server computer to the client computer.

9. The method of claim 8 further comprising:
   receiving, by the client computer from the server computer, decrypted blinded symmetric key; and
   unblinding the decrypted blinded symmetric key, by the specific client computer, using the attached policy information and an unblinding factor corresponding to the onetime use blinding factor to thereby obtain the symmetric key in plaintext.

10. The method of claim 9 wherein the unblinding factor comprises the modular multiplicative inverse of the blinding factor.

11. The method of claim 9 wherein the unblinding comprises unblinding the decrypted blinded symmetric key bound to the attached policy information by applying $K = \Phi R^{-1}$ mod N, where $\phi$ is the decrypted blinded symmetric key bound to the to the attached policy information, $R^{-1}$ is the modular multiplicative inverse of the blinding factor, N is a corresponding RSA modulus and S is the secret in plaintext.

12. The method of claim 1 further comprising: blinding multiple separate encrypted symmetric keys, by the client computer and for each separate encrypted symmetric key blinded by the specific client computer, generating a separate onetime use blinding factor, and using a separate generated onetime use blinding factor to blind each separate encrypted symmetric key.

13. The method of claim 1 wherein the policy comprises parsable data structures that include identifiers of multiple recipients, wherein the recipient identifiers include information used for messaging or authentication of individual or another computer.

14. The method of claim 1 wherein the client does not maintain a key directory of other clients mapped to one or more cryptographic keys.

15. A computer implemented method comprising:
   receiving, by an server computer from a client computer, an encrypted blinded symmetric key bound to policy information corresponding to a policy governing the client computer, the encrypted blinded symmetric key having been encrypted using the policy information and a public key sent by the server computer during policy creation which includes the server validating the policy information against a corresponding client policy creation configuration, the encrypted symmetric key having been blinded by the client computer using a onetime use blinding factor and the policy information;
   decrypting the encrypted blinded symmetric key, by the server computer, using a private key held by the server computer and the policy information, to thereby obtain a decrypted blinded symmetric key bound to the policy information, wherein the blinding factor is not communicated to the server and wherein the decrypted blinded symmetric key is not discernible to the server computer; and
   processing the decrypted blinded symmetric key, by the server computer, according to the policy corresponding to the policy information to which the encrypted blinded symmetric key is bound.

16. The method of claim 15 wherein decrypting the encrypted blinded symmetric key comprises decrypting the encrypted blinded symmetric key using an RSA decryption function, with an RSA primes, the policy information, and RSA modulus as parameters.

17. The method of claim 16 further comprising decrypting the encrypted blinded symmetric key by applying $(Z_p)^d$ mod N, where $Z_p$ is the blinded, encrypted symmetric key, d is derived from the RSA primes, p is unique policy information, and N is the RSA modulus, resulting in the decrypted blinded symmetric key bound to the policy information.

18. The method of clause 15 wherein further processing the decrypted blinded symmetric key according to the specific policy information to which the encrypted blinded symmetric key is bound further comprises: transmitting the decrypted blinded symmetric key bound to the policy information, by the server computer to the client computer.

19. The method of claim 15 wherein the policy comprises parsable data structures that include identifiers of multiple recipients, wherein the recipient identifiers include information used for messaging or authentication of individual or another computer.

20. The method of claim 15 wherein the client does not maintain a key directory of other clients mapped to one or more cryptographic keys.

21. A computer implemented method comprising:
receiving separate encrypted blinded symmetric keys, by a server computer from a plurality of client computers, each separate encrypted blinded symmetric key being bound to corresponding policy information corresponding to a policy governing a specific one of the client computers from which a bound encrypted blinded symmetric key was received, wherein the policy was created by validating the policy information against a corresponding client policy creation configuration; and
processing each encrypted blinded symmetric key, by the server computer, according to the corresponding policy information to which the specific encrypted blinded symmetric key is bound.

22. The method of claim 21 wherein processing the encrypted blinded symmetric keys comprises decrypting at least a subset of the encrypted blinded symmetric keys, by the server computer, using private keys held by the server computer and corresponding policy information to which the specific received encrypted blinded symmetric key is bound, resulting in blinded symmetric key being bound to the corresponding policy information which is not discernible to the server computer.

23. The method of claim 22 further comprising transmitting different decrypted blinded symmetric keys bound to different policies to different ones of the plurality of client computers, whereby different ones of the plurality of client computers can unblind received decrypted blinded symmetric keys using corresponding policy information to which the received decrypted blinded symmetric keys are bound and unblinding factors corresponding specific onetime use blinding factors, to obtain corresponding symmetric keys in plaintext.

24. The method of claim 22 wherein decrypting a specific encrypted blinded symmetric key using private key held by the server computer and a specific policy information comprises decrypting the specific encrypted blinded symmetric key using an RSA decryption function, with an RSA primes, the specific policy information and an RSA modulus as parameters.

25. The method of claim 21 wherein the policy comprises parsable data structures that include identifiers of multiple recipients, wherein the recipient identifiers include information used for messaging or authentication of individual or another computer.

26. The method of claim 21 wherein the client does not maintain a key directory of other clients mapped to one or more cryptographic keys.

* * * * *